May 23, 1950 — J. B. GRAHAM — 2,508,914
PIPE COUPLING
Filed March 5, 1947 — 5 Sheets-Sheet 1

Inventor
James B. Graham
By Donald G. Dalton
His Attorney

May 23, 1950  J. B. GRAHAM  2,508,914
PIPE COUPLING

Filed March 5, 1947 5 Sheets-Sheet 2

Inventor
James B. Graham
Donald G. Dalton
His Attorney

May 23, 1950     J. B. GRAHAM     2,508,914
PIPE COUPLING

Filed March 5, 1947     5 Sheets-Sheet 3

Inventor
James B. Graham
Donald G. Dalton
By
His Attorney

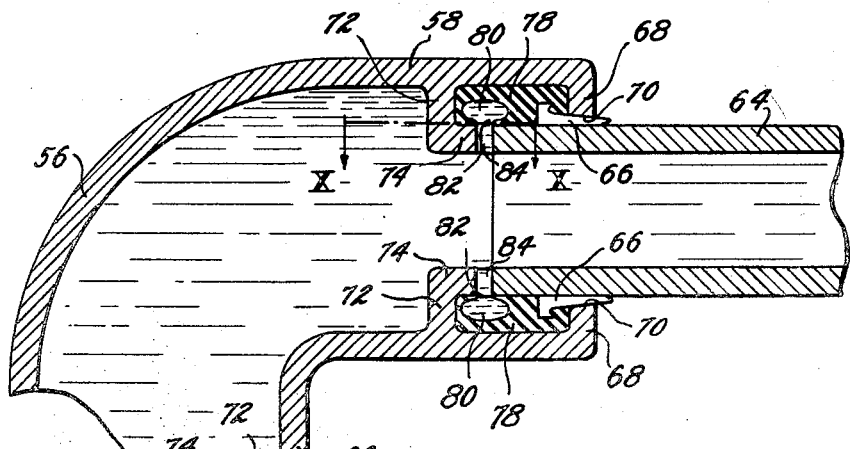
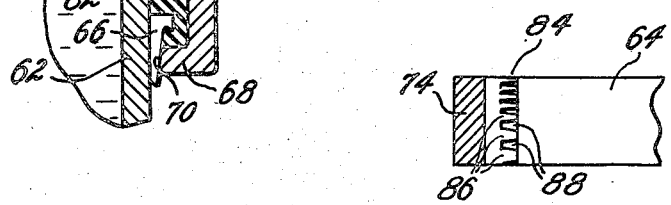
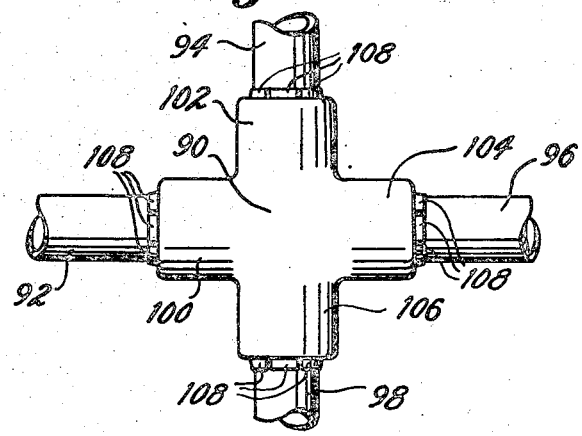

May 23, 1950   J. B. GRAHAM   2,508,914
PIPE COUPLING
Filed March 5, 1947   5 Sheets-Sheet 5
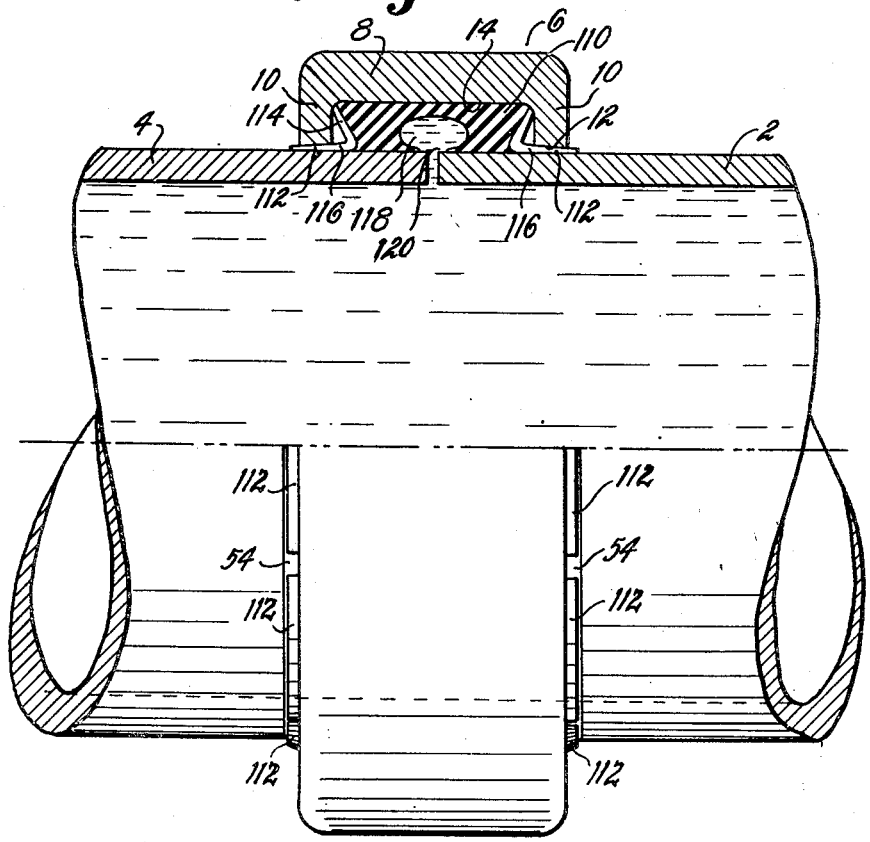
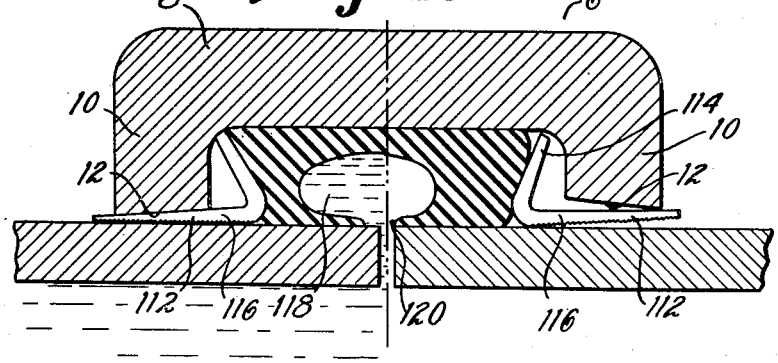
Inventor
James B. Graham
by Donald G Dalton
His Attorney Patented May 23, 1950

2,508,914

UNITED STATES PATENT OFFICE 2,508,914

PIPE COUPLING

James B. Graham, South Hills, Pa., assignor to National Tube Company, a corporation of New Jersey Application March 5, 1947, Serial No. 732,607

7 Claims. (Cl. 285—193)

1

This invention relates to pipe couplings and more particularly to quickly connected and disconnected couplings for plain ended pipe.

Among the objects of the present invention is the provision of a pipe coupling which may be quickly and easily applied to plain ended pipe, which is simple to construct, dependable in operation, and easy to manufacture.

A further object of the invention is the provision of a coupling which will permit limited amounts of disalignment between the coupling and the pipe or pipes connected thereto, and which may be easily and effectively assembled in the field with a minimum effort and by the use of simple tools. Included within the meaning of the term "couplings" as used in the following description of the invention, are not only pipe joining means for connecting lengths of pipe end to end but also all other types of fittings for joining pipes to each other, such as L's, T's, crossovers, and so forth.

Frequently temporary pipe lines, such as gathering lines to oil wells, are laid upon the surface of the ground. Another use for such pipe lines is that for irrigation purposes. During the late war, there was a great demand for such lines for the purpose of conveying water and gasoline for advancing armies. All of these uses of surface pipe lines, particularly temporary lines of this character, require pipe joining means of simple, economical design, which are simple to operate, if the lines are to be installed, and removed when necessary, in a fast economical manner.

Previous joints for pipe lines of this type have required skilled labor and a number of tools, some of the prior designs also requiring a groove to be machined in the end of the pipe, which makes difficult the recovery of pipe, from which the end must be cut in the field. Grooves in the ends of pipe to make possible the use of such last named coupling must be cut to considerable depths. This so weakens the pipe that in some instances, where fluid under appreciable pressure is to be carried, heavier pieces of pipe must be welded to the thin pipe and the groove cut into the heavier pipe. It is obvious that such prior designs of pipe coupling are expensive and time-consuming to install and are difficult to remove.

My invention provides pipe couplings particularly useful in temporary pipe lines, such couplings being self-sealing in that they employ expanding packings which are placed into communication with the space within the pipe or pipes joined thereby. Such packings have positioned adjacent thereto, and preferably included

2 therein, slip segments cooperating between a conical inwardly facing surface on the coupling and the outer surface of the pipe in such manner that expansion of the packing by the fluid in the pipe causes the slip segments to be wedged between the surface of the coupling and the pipe. Such design of coupling produces a joint having substantially the same strength as that of the pipe itself. The coupling of the present invention may be used on any thickness of pipe without requiring grooving of the ends or any other machining operation. The coupling has the further advantage of requiring no tools or skilled labor, the pipe to be joined being simply pushed into the coupling to a predetermined extent, fluid pressure thereupon being applied to the interior of the pipe, such fluid expanding the packing and setting the slip segments against the pipe, thereby preventing the pipe from pulling out of the coupling.

The invention will be more readily understood by consideration of the accompanying drawings in which:

Figure 9 is a view in axial section through the L shown in Figure 8;

Fig. 10 is a view in cross section through a portion of the L, the section being taken along the line X—X of Figure 9;

Figure 11 is a view in plan of a crossover fitting employing the pipe sealing and gripping means of the invention;

Figure 12 is a view partially in elevation and partially in vertical section, similar to Figure 1, of a coupling employing a further modification of the slip segments and a modified packing cooperating therewith; and Figure 13 is an enlarged view in section, similar to Figure 3, of the portion of the coupling shown in section in Figure 12.

Figure 1:
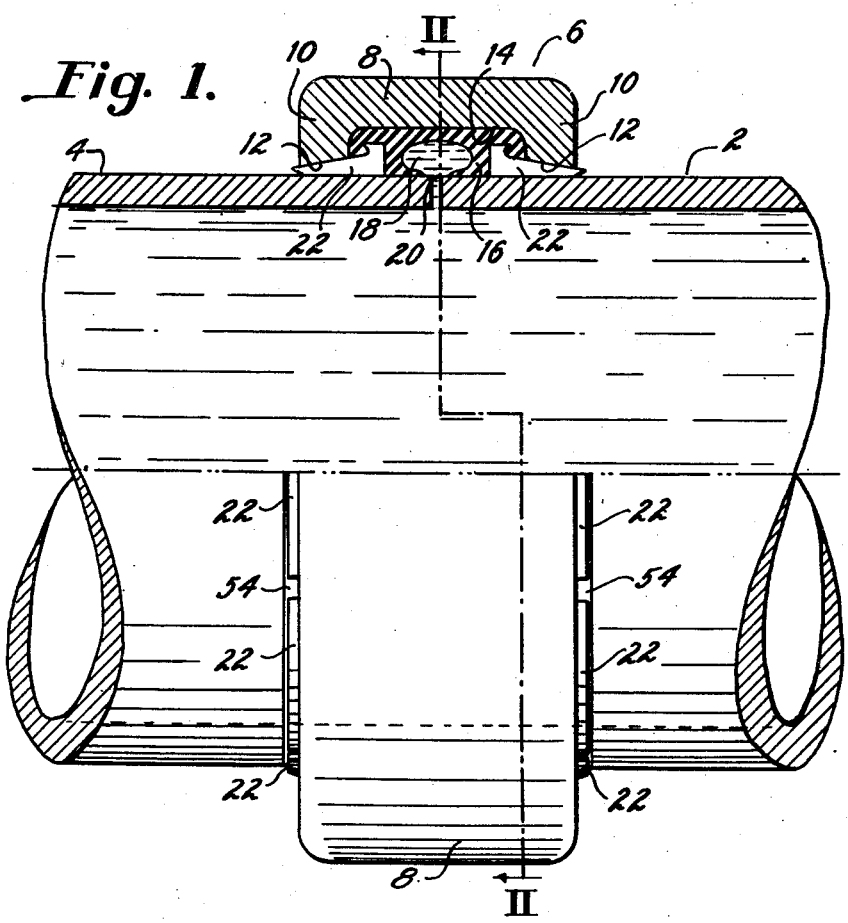
Figure 1 is a view partially in elevation and partially in vertical section of two pipes joined end to end by a straight coupling made in accordance with the invention.
Figure 3:
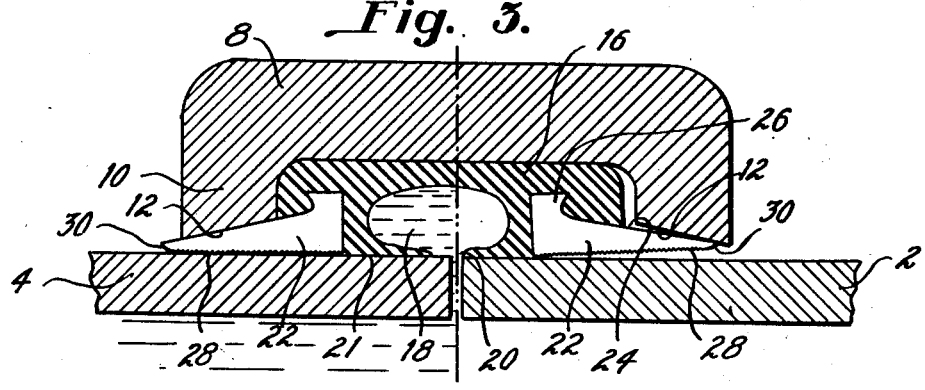
Figure 3 is an enlarged view, in section, of the portion of the coupling shown in section in Figure 1, the right-hand portion of the packing and slip segments therein being shown in the position they assume when the packing is free from fluid pressure, and the left-hand portion of the figure showing the packing and segments in operative joint sealing and pipe gripping position.

The embodiment of the coupling of the invention shown in Figures 1 to 4, inclusive, is adapted for the joining end to end of plain ended pipe. The pipes to be joined are designated 2 and 4, respectively, the coupling being designated generally by the character 6. The coupling includes a main portion 8 of relatively heavy section high strength material, such as steel. The body is in the form of an annulus, the main portion of which is of materially greater diameter than the pipes and the ends of which are in the form of inturned flanges 10 which approach the pipes to be joined and form an annular space or cavity 14 between them, the main portion of the housing, and pipes to be joined. Each of the inturned flanges 10 is provided with an outwardly converging conical seat 12, the apex of each cone lying substantially on the axis of the pipes to be joined, the apex of each lying outside the coupling on the same side thereof as the conical seat and at a point remote from the ends of the pipe at the coupling. Within the cavity 14 in the housing of the coupling there is positioned the resilient packing 16 made of an elastomer such as rubber or synthetic rubber-like materials. The packing 16 is provided with a centrally located cavity 18 having an annular slot 20 through the inner wall thereof and centrally located with respect to the cavity 18 to provide access for the fluid in the pipes to such cavity. The packing is provided with an inner cylindrical surface 21 for cooperation with the ends of the pipes to effect a seal therewith when it is expanded by being subjected to pressure.

Figure 2:
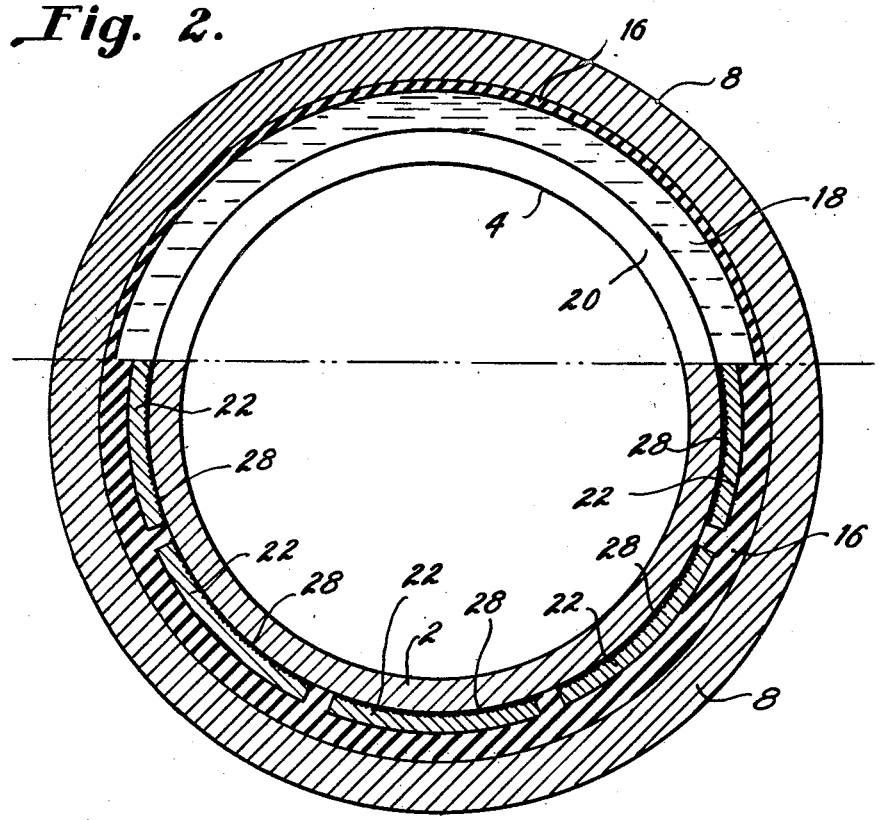
Figure 2 is a view in transverse section through the coupling joint shown in Figure 1, the section being taken along the line II—II of Figure 1.

Included within the ends of the packing 16 are a plurality of slip segments 22 which extend around the coupling, the segments being spaced somewhat from one another, as shown in Figure 2, to allow free axial movement thereof. The slip segments are in the form of wedges, the inner surfaces of which are curved to conform to the pipes, the upper surfaces 24 of the segments being of conical curvature substantially identical with that of the seat 12 and the bottom of such segments having a curvature which is cylindrical and substantially that of the outer surface of the pipe. The segments are preferably molded into the packing 16 at the time of formation of the latter, being retained therein both by adhesion to the elastomer and mechanically by the projection 26 which, in effect, forms a dovetail joint. Preferably, to increase the gripping effect of the segments, the bottoms thereof are serrated as shown at 28, Figures 3 and 4. The segments 22 in the embodiment shown are made of such length that their outer ends 30 project somewhat beyond the outer surface of flange 10, as shown in the left-hand portion of Figure 3. With such construction it is possible, upon disassembly of the coupling, to free the slip segments from the housing and pipe by driving the segments backward as by hammering the ends 30 of the slip segments in a direction toward the longitudinal center of the coupling.

The packing 16, as stated, is made from rubber or rubber-like material, generically termed an elastomer. The packing may be composed of a natural rubber alone, or of a tire stock, such as the so-called 60% tire stock, containing natural rubber and carbon black. It is also possible to use for such packing any of the so-called synthetic rubbers which are vulcanizable, such as polymers of chloroprene, sold under the trade name Neoprene, Soyprene, and GR-M, copolymers of butadiene and styrene, sold under the trade names Buna S, Chemigum IV, Hycar OS, and GR-S, polymers of butadiene, sold under the trade names Buna 85, Buna 115, SKA, and SKB, copolymers of butadiene and acrylonitrile, sold under the trade names Perbunan, Buna N, Perbunan Extra, Chemigum III, Hycar OR, and Thiokol RD, and copolymers of isobutylene and butadiene or isoprene, sold under the trade names Butyl or GR-I. It is to be understood that the above list is not exhaustive, and that various other vulcanizable elastomers, natural or synthetic, may be employed. In applications wherein the fluid to be carried in the pipes tends to be solvent to natural rubber, the various synthetic rubbers such as Neoprene may be used to advantage for the packing.

Figure 5:
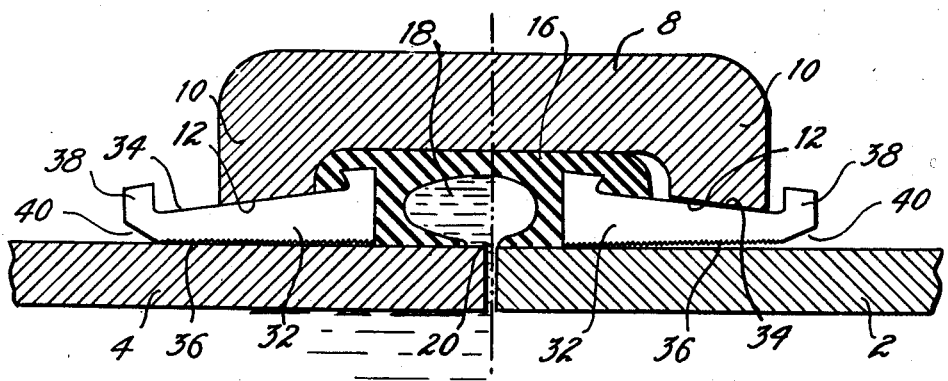
Figure 5 is a view in section, similar to Figure 3, of a portion of a coupling employing modified slip segments.
Figure 4:
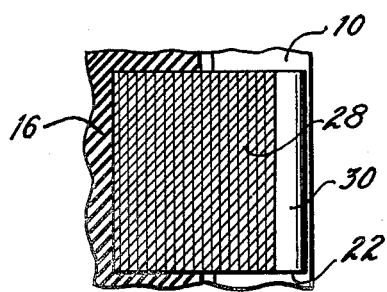
Figure 4 is a view in plan of the bottom of a slip segment shown as a part of the coupling in the embodiment shown in Figures 1, 2, and 3.
Figure 7:
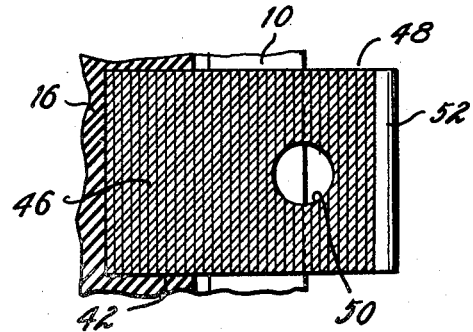
Figure 7 is a view in plan of the bottom portion of the slip segment employed in the embodiment of the coupling shown in Figure 6.

In some instances it is desired to seat, to a certain extent, the slip segments against the pipes to be joined before the application of pressure thereto, to insure that the pipes will not pull out of the coupling before the segments have had a chance to become firmly seated thereagainst by the expansion of packing 16. For such application, the embodiments of the couplings shown in Figures 5 and 6 have proved eminently successful. In the embodiment shown in Figure 5, the slip segments 32 are made somewhat longer than those in the embodiment above described, so that their outer ends project a substantial distance beyond the outer surface of flanges 10 even when the packing is not subjected to internal pressure. The segments 32 are provided with upper conical surfaces designated 34, which cooperate with the conical seats 12, and with lower cylindrical serrated bottom surfaces 36. The outer ends of the segments have upturned projections 38 thereon, and are provided with the inner conical surface 40 to facilitate the insertion of the pipe within the coupling. The upturned projections 38 on the ends of the slip segments make possible the insertion of a pry bar or the like between such flanges and the flange 10 of the housing so that the segments may be forced outwardly of the coupling into firm contact with the conical seat 12 and the pipe before fluid pressure is applied to the pipe system.

Figure 6:
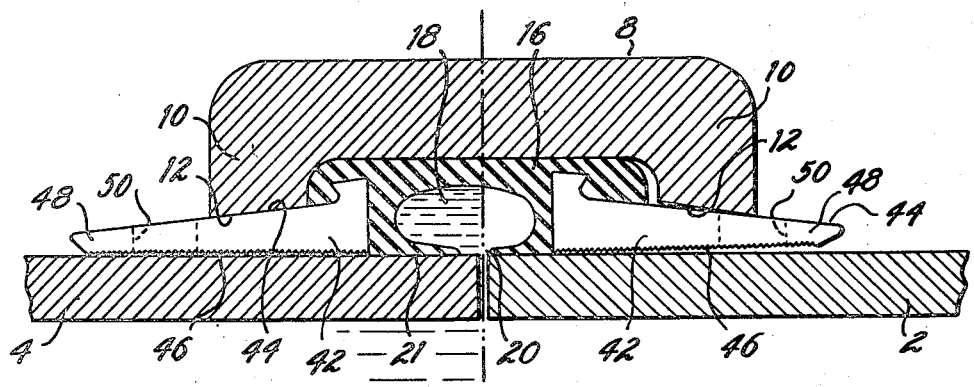
Figure 6 is a view in section, similar to Figure 3, employing a further modification of the slip segments.

The same presetting of the segments against the pipes may be effected, in the embodiment of the coupling shown in Figure 6, wherein the slip segments 42, provided with an upper conical surface 44 and the bottom serrated surface 46, are likewise of such length as to extend a substantial distance past the outer surface of flange 10 when the packing 16 is not subjected to fluid pressure. The outer ends 48 of the slip segments 42 are provided with vertically extending holes 50 so positioned that at least a substantial portion of the hole remains outside the housing body at all times. The insertion of a pry bar into the hole 50 allows the slip segments 42 to be moved axially of the coupling housing to set such segments into firm engagement with the conical seat 12 of the coupling and the pipe to be joined thereto.

The extent of insertion of the pipes to be joined into the coupling shown in Figures 1 to 7, inclusive, and thus far described, should be such that the pipes are positioned symmetrically with respect to the housing. Preferably a slight space is left between the confronting ends of the pipes in the location of the slot through the packing leading to the cavity therein, although leakage of fluid into the packing cavity occurs to expand the packing even should the pipes be abutted at such location. For ease and accuracy of assembly, however, it is preferred to provide each of the pipes with a circumferential marking, such as the painted mark 54, shown in Figure 1, to allow the workman to judge how far the pipe should be thrust into the coupling to effect the desired positioning of the pipe ends.

Figure 8:
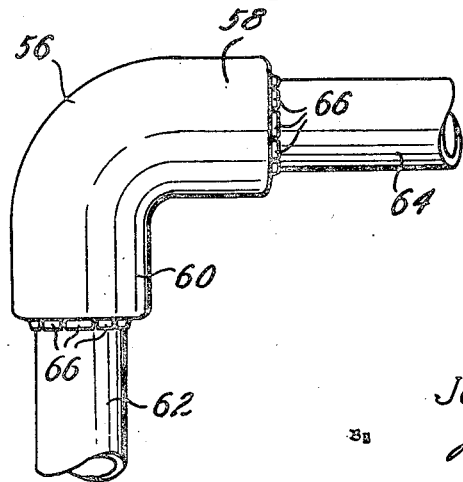
Figure 8 is a view in plan of an L employing the pipe sealing and gripping means shown in the embodiment illustrated in Figures 1, 2, and 3.

In Figures 8, 9, and 10 there is shown an L fitting, and in Figure 11 a crossover fitting, both including the pipe sealing and gripping means of the present invention. The L fitting shown in Figures 8 and 9 has a main body portion generally designated 56, one leg of the fitting being denoted 58 and the other 60. The pipes to be joined by such fitting are designated 62 and 64, such pipes being shown inserted into the legs 60 and 58, respectively. The pipe sealing and gripping means in such fitting, best shown in Figure 9, are generally similar to those employed in the straight coupling previously described, but are different therefrom in that they are one-ended rather than being symmetrical about the longitudinal axis. Such sealing and gripping means are similar at both ends of the L. The fitting, at the end of each leg, has an inturned flange 68 provided with an inwardly facing conical seat 70 disposed in the same manner as seat 12 in the previously described embodiments of the straight coupling. The packing 78, made of an elastomer as above described, is contained in the annular space provided within the outer body of the fitting at the end of the leg, flange 68, the radially directed inwardly located leg 72, and the annular ledge 74 at the inner end of such leg. The leg 72 and the ledge 74 are of such size and are so located that the ledge abuts the inner end of the pipe to be joined. Packing 78 has a cavity 80 therein, such cavity communicating with the space within the fitting and the pipe system through the radial slot 82 in the packing. The packing is also provided with a series of slip segments 66 which may be of the same design as segments 22 of the first described embodiment.

It is possible for the radially disposed edge of ledge 74 confronting the end of the pipe to be smooth and to have the pipe thrust directly into contact therewith, since there will still be sufficient leakage between the pipe and the ledge to place cavity 80 into communication with the fluid carrying space within the pipe and fitting. It is preferred, however, that such inner edge of the ledge be made in the form more clearly shown in Figure 10, in which such edge is shown provided with serrations 84, such serrations being formed by the spaced projections 86 having the gaps 88 between them. The projections 86 form stops against which the inner end of the pipe to be joined may be thrust, thereby insuring adequate flow of fluid into the cavity 80 and avoiding the use of marks on the pipe to indicate the extent of its insertion into the fitting.

The crossover shown in Figure 11 has a main body 90 provided with the four legs 100, 102, 104, and 106 into which are inserted the pipes 92, 94, 96, and 98, respectively. The structure of the sealing and pipe gripping means in such crossover is the same as that shown in Figure 9 for the L fitting, such means including an expansible hollow packing means contained within the leg and slip segments 108 connected therewith for gripping the pipe upon expansion of the packing.

In Figures 12 and 13 there is shown an additional modification of the pipe coupling of the invention. Such modification employs pipe coupling slip segments which are self-releasing, that is to say, they tend to draw back and away from the pipe and the conical seat on the coupling housing upon release of pressure within the pipe, so that the pipe may immediately be withdrawn from the coupling. In these figures the pipes, the coupling housing, and the parts of such housing are designated by the same reference characters as those employed in Figures 1, 2, and 3. The coupling shown is of the straight type joining pipes end to end, but it is to be understood that the teaching of the embodiment may be applied to L's, T's, and crossovers by suitable modification of each end of the coupling device in a manner similar to that shown in Figure 9.

The coupling employs a hollow resilient packing 110 made of an elastomer, such packing having the centrally located cavity 118 therein, access to which is afforded by inlet channel 120 which communicates with the gap between the ends of the pipes to be joined. The pipes are provided with the painted circumferential stripes 54, as before, to allow the insertion of the pipe ends in the coupling to the desired extent. Pipe gripping segments generally designated 116 in this modification, are in the form of springs, the two legs 112 and 114 of which are located at an acute angle with respect to each other. Segments 116 are made of spring metal such as spring steel. The lower leg 112 is of a tapered longitudinal cross section for cooperation with the conical seat 12 of the coupling housing, so that legs 112 of the segments grip the pipe with which they are in contact upon their travel outwardly of the coupling housing. The configuration of member 116 and the length of arm 114 thereof are such that when the segment 116 is thrust outwardly by the packing 110, as shown at the left hand side of Figure 13, the upper end of leg 114 contacts the upper corner of the cavity within the housing and spreads legs 112 and 114 wider apart than their normal unstressed position. By reason of such construction, when fluid pressure within the cavity 118 of packing 110 is released, as shown at the right hand portion of Figure 13, leg 114 again resumes its customary unstressed position with respect to leg 112, thereby retracting segment 116 from gripping relationship with the pipe.

Segments 116 need have no connection with packing 110; they may merely lie within the coupling in abutting relationship to the packing, if desired. For ease of assembly, however, and to allow the segments to be retained within the coupling upon assembly and disassembly of the pipes it is sometimes preferred to bond the outer edge of the packing 110 to leg 114 of the segments. This may be done by use of any one of several well-known methods, one of which involves the copper plating of leg 114, the interposition of a suitable elastic adhesive material between such leg and the outer edge of the packing, and the vulcanizing of such adhesive layer.

Although I have disclosed and illustrated preferred embodiments of the pipe coupling of my invention, it will be understood that the invention is not to be limited thereto but that it is defined within the scope of the following claims.

I claim:

1. A pipe coupling comprising an annular body adapted to receive a pipe end, said body having an annular recess therein around the pipe receiving space, a deformable annular packing member in such recess, the inner surface of the packing member being adapted to cooperate with the outer surface of a pipe therein to seal the joint therebetween when subjected to fluid pressure, and pipe gripping means in the coupling actuated by the deformable packing member, such gripping means comprising an outwardly converging seat within the outer end of the annular coupling body, a plurality of slip segments contiguous to the packing member, the segments being located within such seat and cooperating therewith to grip the pipe inserted in the coupling within such segments when the latter are thrust outwardly by the packing when it is subjected to fluid pressure, each of such segments having an outer end which projects beyond the coupling body at all times when a pipe is inserted therein, and means on such outer end of the segment to allow it to be drawn outwardly of the coupling body before the packing is subjected to pressure, thus preseating the segments against the seat and the pipe.

2. A pipe coupling comprising an annular body adapted to receive a pipe end, said body having an annular recess therein around the pipe receiving space, a deformable annular packing member in such recess, the inner surface of the packing member being adapted to cooperate with the outer surface of a pipe therein to seal the joint therebetween when subjected to fluid pressure, and pipe gripping means in the coupling actuated by the deformable packing member, such gripping means comprising an outwardly converging seat within the outer end of the annular coupling body, a plurality of slip segments contiguous to the packing member, the segments being located within such seat and cooperating therewith to grip the pipe inserted in the coupling within such segments when the latter are thrust outwardly by the packing when it is subjected to fluid pressure, each of such segments having an outer end which projects beyond the coupling body at all times when a pipe is inserted therein, and means on such outer end of the segment to allow it to be drawn outwardly of the coupling body before the packing is subjected to pressure, thus preseating the segments against the seat and the pipe, such last named means comprising an upturned projection thereon to allow the insertion of a pry bar between it and the outer end of the coupling body.

3. A pipe coupling comprising an annular body adapted to receive a pipe end, said body having an annular recess therein around the pipe receiving space, a deformable annular packing member in such recess, the inner surface of the packing member being adapted to cooperate with the outer surface of a pipe therein to seal the joint therebetween when subjected to fluid pressure, and pipe gripping means in the coupling actuated by the deformable packing member, such gripping means comprising an outwardly converging seat within the outer end of the annular coupling body, a plurality of slip segments contiguous to the packing member, the segments being located within such seat and cooperating therewith to grip the pipe inserted in the coupling with such segments when the latter are thrust outwardly by the packing when it is subjected to fluid pressure, each of such segments having an outer end which projects beyond the coupling body at all times when a pipe is inserted therein, and means on such outer end of the segment to allow it to be drawn outwardly of the coupling body before the packing is subjected to pressure, thus preseating the segments against the seat and the pipe, said last named means comprising vertical openings in the outer end of the segment, such opening remaining at least partially outside the coupling body at all times to allow the insertion of a segment preseating means therein.

4. A straight pipe coupling for joining pipes end to end comprising an annular body adapted to receive the ends of the pipes to be joined in substantially abutting relationship, said body having an annular recess therein radially outside and around the ends of the pipes to be joined, an annular hollow expansible packing member in such recess, the inner surface of the packing member being adapted to cooperate with the outer surface of a pipe inserted in the coupling to seal the joint therebetween when the interior of the packing member is subjected to fluid pressure, and pipe gripping means in the coupling at each end thereof actuated by the expansible packing member, each such gripping means comprising an outwardly converging conical seat within the outer end of the coupling body, a plurality of slip segments having their inner ends attached to the packing member adjacent the outer edge thereof, each slip segment having a conical outer surface similar to the conical surface of the seat and an inner cylindrical surface similar to the outer surface of the pipe, the segments being located within such seat and cooperating therewith to grip the pipe inserted in the coupling within such segments when the interior of such packing member is subjected to fluid pressure.

5. In a pipe joint, a coupling member constructed to receive the end of a pipe member, such coupling member having an annular recess therein, an annular flange on the coupling member inturned toward the pipe member forming one boundary of the annular recess substantially perpendicular to the axis of said pipe member, the inner surface of the flange member confronting the pipe member being of a conical shape, the apex of the cone lying substantially on the axis of the pipe member remote from the end received in the coupling member, an annular packing member made of an elastomer received in said recess, said packing member having an annular cavity therein communicating with the interior of the pipe member, the packing member being of a length, when the cavity therein is not subjected to substantial pressure, which is materially less than the length of the recess in the coupling member, a plurality of slip segments tapered in the same direction as the inner surface of the flange member positioned within such member, the slip segments being so positioned relative to the packing member that upon insertion of the pipe member into the coupling and the subjection of the annular cavity within the packing member to fluid pressure the packing member expands to form a sealed joint with the pipe member and thrusts the slip segments outwardly of the coupling and thus into tight engagement with the conical seat and the pipe member, the ends of said slip segments extending beyond said coupling to permit loosening of the slip segments and facilitate the removal of the pipe member from said coupling.

6. In a pipe joint, a coupling member constructed to receive the end of a pipe member, such coupling member having an annular recess therein, an annular flange on the coupling member inturned toward the pipe member forming one boundary of the annular recess substantially perpendicular to the axis of said pipe member, the inner surface of the flange member confronting the pipe member being of somewhat greater diameter than the pipe member and of conical shape, the apex of the cone lying substantially on the axis of the pipe member remote from the end received in the coupling member, an annular packing member made of an elastomer received in said recess, said packing member having an annular cavity therein communicating with the interior of the pipe member, a plurality of tapered slip segments tapered in the same direction as the inner surface of the flange member of the coupling positioned with their outer surfaces in contact with the inner surface of the flange member of the coupling member, the inner ends of the slip segments being embedded in the ends of the packing member, whereby upon insertion of the pipe member into the coupling and the subjection of the annular cavity within the packing member to fluid pressure the packing member expands to form a sealed joint with the pipe member and thrusts the slip segments outwardly of the coupling and thus into tight engagement with the conical seat and the pipe member.

7. A pipe coupling comprising an annular body adapted to receive a pipe end, said body having an annular recess therein around the pipe receiving space, a deformable annular packing member in such recess, the inner surface of the packing member being adapted to cooperate with the outer surface of a pipe therein to seal the joint therebetween when subjected to fluid pressure, and pipe gripping means comprising an outwardly converging seat within the outer end of the annular coupling body, a plurality of slip segments contiguous to the packing member, a portion of said segments in the form of a first leg, being located within such seat and cooperating therewith to grip the pipe inserted in the coupling, each segment having a second leg outside the seat disposed at an angle to the leg within the seat, the segments being made of spring metal, the second leg of each segment being so disposed with respect to the cavity in the coupling that each segment is deformed under stress upon the thrusting outwardly of the first leg by the packing and that the first leg is retracted to pipe releasing position when the packing contracts upon release of the fluid pressure.

JAMES B. GRAHAM.

REFERENCES CITED

The following references are of record in the file of this patent:

UNITED STATES PATENTS

| Number | Name | Date |
|---|---|---|
| 2,017,994 | Spang | Oct. 22, 1935 |
| 2,184,376 | Beyer | Dec. 26, 1939 |
| 2,451,354 | Ohls | Oct. 12, 1948 |